United States Patent [19]

Thorsrud

[11] Patent Number: 4,556,603

[45] Date of Patent: Dec. 3, 1985

[54] METHOD OF MAKING LIGHTWEIGHT THERMOPLASTIC ELASTOMER AND PRODUCT THEREOF

[75] Inventor: Agmund K. Thorsrud, Bartlesville, Okla.

[73] Assignee: Phillips Petroleum Company, Bartlesville, Okla.

[21] Appl. No.: 591,755

[22] Filed: Mar. 21, 1984

[51] Int. Cl.$^4$ ................................................. C08K 3/40
[52] U.S. Cl. ................................ 428/283; 523/218; 523/219; 523/351; 524/534
[58] Field of Search ............... 428/283; 523/218, 219, 523/351

[56] References Cited

U.S. PATENT DOCUMENTS

| | | | |
|---|---|---|---|
| 3,317,455 | 5/1967 | Blome et al. | 523/218 |
| 3,553,002 | 1/1971 | Haraway et al. | 523/219 |
| 3,823,109 | 7/1974 | Middlebrook | 525/314 |
| 3,826,776 | 7/1974 | Wright | 524/424 |
| 3,959,545 | 5/1976 | Siedenstrang | 428/141 |
| 4,085,937 | 4/1978 | Schenk | 523/219 |
| 4,186,234 | 1/1980 | Sakashita et al. | 428/283 |
| 4,368,828 | 1/1983 | Samuel et al. | 524/219 |

FOREIGN PATENT DOCUMENTS 51-49228  4/1976  Japan .................................. 523/218

*Primary Examiner*—Lewis T. Jacobs
*Attorney, Agent, or Firm*—C. F. Steininger

[57] ABSTRACT

A lightweight, thermoplastic elastomer composition is prepared by mixing a thermoplastic elastomer, such as a styrene/butadiene block copolymer, an extender oil and, optionally, at least part of a dense, particulate filler such as silica, at an elevated temperature to form a viscous, liquid masterbatch and, thereafter, mixing hollow microspheres, such as hollow glass microspheres, and all or the remainder of a dense, particulate filler, if any, with the masterbatch at an elevated temperature to form the lightweight, thermoplastic elastomer composition. The thermoplastic elastomer composition is preferably formed into a flexible, lightweight sheet-type structure particularly suitable for use as a sound or heat insulating material for automotive, aircraft and construction uses.

26 Claims, No Drawings

METHOD OF MAKING LIGHTWEIGHT THERMOPLASTIC ELASTOMER AND PRODUCT THEREOF

The present invention relates to an improved method of making a lightweight, thermoplastic elastomer and product thereof. In a more specific aspect, the present invention relates to a method of making a flexible, lightweight, sheet-type thermoplastic elastomer and product thereof.

BACKGROUND

It is known in the art to produce flexible sheet-type products, particularly suitable for use as sound insulation, heat insulation and the like, by incorporating a dense, particulate filler, such as barium sulfate (barytes), barium titanate, silicon dioxide (silica) and the like in rubber compositions. However, the high specific gravity, for example, 4.54 for barytes, causes such products to be quite heavy. In order to overcome this problem and produce a lightweight material, it is also known to incorporate hollow microspheres, such as hollow glass or silicate spheres, film forming plastics, etc. of low density in certain polymer products. While sheet-type structures incorporating these hollow microspheres produce a lighter sheet-type structure, problems in the preparation of the sheet-type structure make it impossible to obtain the full benefit of the use of the lightweight material. Specifically, conventional practice is to incorporate the hollow microspheres in a liquid polymerizable material before polymerization. In such cases, however, at least some degree of mixing is necessary to produce a homogeneous mixture which can be formed into a sheet-type structure. Such mixing results in the fracture or crushing of the hollow microspheres and thus a loss of the benefit of the microspheres. It has been found that this problem, of the crushing of the hollow microspheres, is particularly troublesome in attempts to incorporate hollow microspheres into a rubber composition, since the formation of rubber compositions requires high shear forces during mixing operations. The ultimate result is that the hollow microspheres are crushed during mixing with a substantial loss if not the loss of all of the benefit of the hollow microspheres.

SUMMARY OF THE INVENTION

It is therefore an object of the present invention to provide an improved method of making a lightweight, thermoplastic elastomer composition and the product thereof. A still further object of the present invention is to provide an improved method for making a flexible, lightweight, sheet-type structure of a thermoplastic elastomer and the product thereof. Yet another object of the present invention is to provide an improved method for making a lightweight, thermoplastic elastomer mixture containing hollow microspheres and the product thereof. Yet another object of the present invention is to provide an improved method for making a lightweight, thermoplastic elastomer containing hollow microspheres in which crushing of the microspheres is substantially reduced and the product thereof. Another and further object of the present invention is to provide a method of making a lightweight, thermoplastic elastomer containing hollow microspheres, and forming a flexible sheet-type structure therefrom. Still another object of the present invention is to provide an improved method of making a flexible, lightweight, thermoplastic elastomer, sheet-type structure of improved mechanial strength and the product thereof. Another and further object of the present invention is to provide an improved method for making a flexible, lightweight, thermoplastic elastomer, sheet-type structure of improved mechanical strength by the addition of a coupling agent thereto and the product thereto. A still further object of the present invention is to provide an improved method of making a flexible, lightweight, thermoplastic elastomer, sheet-type structure and bonding a substrait thereto and the product thereof. These and other objects of the present invention will be apparent from the following description.

In accordance with the present invention, a lightweight, thermoplastic elastomer composition is made by mixing a thermoplastic elastomer, an extender oil and at least part of a dense, particulate filler at an elevated temperature to form a viscous liquid masterbatch and thereafter mixing a hollow, microsphere particulate material and the remainder of the dense particulate filler, if any, with the masterbatch at an elevated temperature to form a lightweight, thermoplastic elastomer composition. The thermoplastic elastomer composition may be formed into a flexible, lightweight, sheet-type structure suitable for use as sound or heat insulation and the like. It is also contemplated that the mechanical strength of such a sheet-type structure can be improved by the addition of a coupling agent or bonding a substrate, such as a nonwoven, fabric, to the sheet-type structure.

DESCRIPTION OF THE PREFERRED EMBODIMENTS

Thermoplastic elastomers useful in the practice of the present invention are normally solid, block copolymers characteristically exhibiting high tensile strength and elongation in their natural condition, that is in their green or unvulcanized state. Particularly useful are linear block or radial teleblock copolymers. More specifically, useful elastomers are radial teleblock copolymers of butadiene/styrene. Such copolymers are described in more detail in U.S. Pat. Nos. 3,823,109; 3,826,776 and 3,959,545. These polymers are prepared by methods well known in the art.

The butadiene/styrene copolymers, discussed above, generally contain about 50 to 90 wt. % butadiene and from 50 to about 10 wt. % of styrene; preferably, from about 50 to 70 wt. % butadiene and about 50 to about 30 wt. % styrene. Copolymers particularly useful in accordance with the present invention are those having from about 60 to about 70 wt. % butadiene. Useful copolymers will generally exhibit a weight average molecular weight in the range of about 75,000 to about 500,000 but a weight range of about 100,000 to about 350,000 is preferable.

It is also within the scope of the present invention to add other polymers to the thermoplastic elastomer in amounts up to about 150 parts by weight of such polymer per 100 parts by weight of the elastomer. Such additional polymers are generally solid resinous polymers of a vinyl substituted aromatic compound, for example, styrene, alpha methyl sytrene, etc., alone or copolymerized with a monomer such as acrylanitrile or a conjugated diene such as butadiene.

The previously mentioned thermoplastic elastomers may also include certain amounts of an extender oil, for example from about 70 to about 350 parts of extender oil per 100 parts of elastomer. Suitable extender oils include materials well known in the art for such purposes, such as napthenic, aromatic and paraffinic petroleum oils, particularly the napthenic type.

It is also frequently desirable to include other additives well known in the rubber art to the elastomers. Specifically, such elastomers should have a heat stabilizer and preferably an anti-blocking/anti-sticking agent. In addition, antioxidants, dense particulate fillers, reinforcing agents and reinforcing resins, pigments, fragrances and the like may be added.

The above-mentioned ingredients, when combined with a solid form of the elastomer, as by solution blending, milling, internal batch mixing, etc. at temperatures between about 200° to about 400° F., are known in the art as a masterbatch. The preferred way of forming thermoplastic elastomer compositions of this character is in a batch-type Banbury mixer, since intense mixing is necessary.

In accordance with the present invention it has been found that, while the above techniques can be utilized for the production of flexible sheet-type structures containing large amounts of dense, inorganic fillers such as barytes, barium titanate, silica and the like, such products are extremely heavy due to the high specific gravity of the dense inorganic fillers. However, it has been found, in accordance with the present invention, that efforts to lighten the products formed from thermoplastic elastomers by the incorporation therein of hollow microspheres, such as hollow glass spheres, hollow spheres made from plastics and the like, results in little improvement in the weight over those formed with dense particulate materials. It has been found that this lack of improvement in the weight of the product is the result of the high shear forces employed in forming the thermoplastic elastomer and incorporating the hollow microspheres therein, which high shear forces tend to crush the hollow microspheres.

It was found in accordance with the present invention that the above problem could be solved by mixing a thermoplastic elastomer and extender oil and at least part of a dense particulate filler at an elevated temperature to form a viscous liquid masterbatch and, thereafter, mixing hollow microspheres of particulate material and the remainder, if any, of a dense particulate filler with the masterbatch at an elevated temperature to form a lightweight, thermoplastic elastomer composition. This lightweight, thermoplastic elastomer composition can then be molded or sheeted to form a flexible, lightweight, sheet-type structure.

Hollow microspheres of any material may be utilized in accordance with the present invention, such as hollow glass spheres, hollow plastic spheres made from a film forming plastic and the like. However, hollow glass spheres are preferred because of their rigid structure, their resistance to attack by other components of the thermoplastic, their resistance to softening or other damage by heat, etc. However, it should be noted, at this point, that such hollow glass spheres are substantially more prone to crushing during the formation of the composition than are hollow plastic spheres, etc.

In a more specific aspect, the first step of the present method comprises mixing the thermoplastic elastomer, preferably some dense filler, the heat stabilizer and the antiblocking/antisticking agent in a mixer, such as a Banbury mixer heated by steam and operating at maximum speed. Preferably, all of the ingredients except one-half of the extender oil are added to the mixer and the heat is raised to about 200° F. Thereafter, between a temperature of 260° F. and 270° F. an additional one-fourth of the oil is added. After a temperature rise of about 10° F., the last one-fourth of the extender oil is added, the steam is turned off and the masterbatch cooled. After an additional two minutes the masterbatch is dumped.

The second step is again carried out in a mixer, such as the Banbury mixer at full steam and maximum speed. In this step, the masterbatch is again heated up to about 200° F. Between about 250° F. and about 260° F., the hollow microspheres are added. After an additional one minute of mixing, all or the remainder of a dense, particulate material is added. Mixing is then continued for an additional two minutes and the composition dumped.

Thereafter the composition can be formed into a flexible, lightweight, sheet-type structure, by molding, sheeting and the like in accordance with conventional practice. In order to illustrate the advantages of the present invention as compared with prior art techniques and the superiority of the products of the present invention over those of the prior art, a series of tests were carried out. In this series of tests, the specific procedure set forth above was utilized in carrying out the two steps of the process.

In this series of tests, the following ingredients, referred to by tradename, were utilized.

Solprene 411S (Trademark of Phillips Petroleum Company), a powdery (10–12 mesh) radial teleblock copolymer containing 30 wt. % styrene and 70 wt. % butadiene; molecular weight: 300,000 (Mw); vinyl content: 11%; prepared by solution polymerization with $SiCl_4$ coupling agent; contains ~1% antioxidants (BHT and TNPP) and 1.25 wt-% alumina hydrate as dusting agent.

Solprene 483S (Trademark of Phillips Petroleum Co.) a powdery oil-extended teleblock copolymer of 40 wt. % styrene and 54 wt. % butadiene; melt flow as 180° C. (5 kg weight) of 1.6; contains 80 phr (parts per 100 parts of rubber) ASTM 104 A-type oil; contains alumina hydrate as dusting agent.

HiSil 233 (Trademark of PPG Industries): an amorphous silica, having a surface area of 140–160 m²/g and an average diameter of 0.022 microns.

Mark 1589 (Trademark of Argus Division of Witco Chemical Co.) a trifunctional hindered phenolic complex heat stabilizer.

Aircosol 4240 (Trademark of Sun Co.) a naphthenic, non-staining extender oil; spec. gravity: 0.943; viscosity: 2206 sus at 100° F.

Struktol WB-16 (Trademark of Struktol Company), mixture of fatty acid soaps, primarily Ca soaps; used as antiblocking/antisticking agent.

Suprex (Trademark of J. M. Huber Corp.) a sedimentary kaolin clay from South Carolina deposits.

Table I below sets forth the ingredients of the composition utilized in each test, the number of steps employed in forming the composition and immediately below the properties of the sheet material produced.

TABLE I

| Ingredients | A | B | C | D | E | F | G |
|---|---|---|---|---|---|---|---|
| Solprene 411S | 100 | 100 | 100 | 100 | 100 | 100 | — |
| Solprene 483S | — | — | — | — | — | — | 180 |
| Hi Sil | 40 | 40 | 40 | 40 | 40 | 40 | 40 |
| Mark 1589 | 1 | 1 | 1 | 1 | 1 | 1 | 1 |
| Circosol 4240 | 200 | 200 | 200 | 200 | 200 | 200 | 120 |
| Struktol WB-16 | 3 | 3 | 3 | 3 | 3 | 3 | 3 |
| Barytes | 800 | 800 | 800 | 800 | 800 | 800 | 800 |
| Suprex Clay | — | — | — | — | — | 200 | — |

TABLE I-continued

| Ingredients | A | B | C | D | E | F | G |
|---|---|---|---|---|---|---|---|
| Microspheres* | — | 200 | 200 | 400 | 600 | 400 | 200 |
| Mixing | 2-step | 1-step | 2-step | 2-step | 2-step | 2-step | 2-step |
| Mixing Time (Min.) | 10.0 | 12.6 | 9.0 | 10.0 | 7.0 | 5.0 | 5.0 |
| Properties | | | | | | | |
| 300% Modules psi | 40 | 60 | 40 | — | — | — | 40 |
| Tensile, psi | 320 | 100 | 90 | 60 | 40 | 140 | 80 |
| Elongation % | 1250 | 750 | 970 | 50 | 20 | 40 | 700 |
| Hardness, Shore A | 23 | 46 | 45 | 63 | 74 | 75 | 54 |
| Graves Tear, pli** | 50 | 30 | 20 | 25 | <10 | 25 | 20 |
| Specific Gravity | 2.14 | 1.93 | 1.75 | 1.64 | 1.60 | 1.78 | 1.71 |

*10–450 microns
**pounds per linear inch, specific gravity 0.7

It is to be observed from the results of the tests summarized above, that, in test A, where dense, particulate filler (barytes) only was utilized, the sheet product had a high specific gravity, even though the barytes was added in the second step of the two-step method of the present invention. It should be further observed, from test B, that, where a substantial volume of hollow microspheres (hollow glass spheres) was used and the process carried out as a single step equivalent to the first step of the present invention, i.e., adding all ingredients, including the barytes and glass microspheres with half the extender oil, thereafter one quarter of the extender oil and finally, the remaining one quarter of the extender oil, little improvement in the specific gravity of the product was obtained. However, it is to be observed, in accordance with test C through G, that a substantial improvement (lowering) of the specific gravity of the product was obtained when hollow microspheres were incorporated by the two-step process of the present invention. This is true even in test F where an additional volume of dense particulate material was added (clay).

While specific materials, conditions of operation, modes of operation and equipment have been referred to herein, it is to be understood that these specific recitals are by way of illustration, to simplify the disclosure and to set forth the best mode of operation in accordance with the present invention only and are not to be considered limiting.

That which is claimed is:

1. A method of making a lightweight, thermoplastic elastomer composition comprising:
   (a) mixing a solid thermoplastic elastomer and an extender oil at an elevated temperature to form a viscous liquid masterbatch; and, thereafter,
   (b) mixing a hollow, microsphere particulate material and a dense, particulate filler with said masterbatch at an elevated temperature to form said lightweight, thermoplastic elastomer composition.

2. A method in accordance with claim 1 wherein the thermoplastic elastomer composition is formed into a flexible, lightweight sheet-type structure.

3. A method in accordance with claim 2 wherein the mechanical strength of the sheet-type structure is improved by the addition of a coupling agent to the ingredients of the masterbatch of step (a).

4. A method in accordance with claim 3 wherein the coupling agent is an inorganic silane.

5. A method in accordance with claim 3 wherein the coupling agent is an inorganic titanate.

6. A method in accordance with claim 2 wherein the mechanical strength of the sheet-type structure is improved by bonding a substrate to at least one side thereof.

7. A method in accordance with claim 6 wherein the substrate is a nonwoven fabric.

8. A method in accordance with claim 1 wherein the masterbatch additionally contains a heat stabilizer.

9. A method in accordance with claim 1 wherein the masterbatch additionally contains an antiblocking/antisticking agent.

10. A method in accordance with claim 1 wherein the thermoplastic elastomer is a conjugated diene/vinyl aromatic block copolymer.

11. A method in accordance with claim 10 wherein the block copolymer is a styrene/butadiene block copolymer.

12. A method in accordance with claim 1 wherein the hollow microspheres are a hollow glass microsphere material.

13. A lightweight, thermoplastic elastomer composition made by:
    (a) mixing a solid, thermoplastic elastomer and an extender oil at an elevated temperature to form a liquid masterbatch; and, thereafter,
    (b) mixing a hollow, microsphere particulate material and a dense, particulate filler with said masterbatch at an elevated temperature to form said light weight, thermoplastic elastomer composition.

14. A product in accordance with claim 13 wherein the thermoplastic elastomer composition is in the form of a flexible, lightweight, sheet-type structure.

15. A product in accordance with claim 13 wherein the masterbatch additionally contains a coupling agent to improve the mechanical strength of the sheet-type structure.

16. A product in accordance with claim 15 wherein the coupling agent is an inorganic silane.

17. A product in accordance with claim 15 wherein the coupling agent is an inorganic titanate.

18. A product in accordance with claim 14 wherein a substrate is bonded to the sheet-type structure to improve the mechanical strength thereof.

19. A product in accordance with claim 18 wherein the substrate is a nonwoven fabric.

20. A product in accordance with claim 13 wherein the masterbatch additionally contains a heat stabilizer.

21. A product in accordance with claim 13 wherein the masterbatch additionally contains an antiblocking-/antisticking agent.

22. A product in accordance with claim 13 wherein the thermoplastic elastomer is a conjugated diene/vinyl aromatic block copolymer.

23. A product in accordance with claim 22 wherein the block copolymer is a styrene/butadiene block copolymer.

24. A product in accordance with claim 13 wherein the hollow microspheres are hollow glass microspheres.

25. A method in accordance with claim 1 wherein at least part of at least one dense, particulate filler is added in mixing step (a) and the dense, particulate filler in mixing step (b) is the remainder of said dense, particulate filler thus added in mixing step (a).

26. A composition in accordance with claim 13 wherein at least part of at least one dense, particulate filler is added in mixing step (a) and the dense, particulate filler in mixing step (b) is the remainder of said dense, particulate filler thus added in mixing step (a).

* * * * *